July 7, 1959 — S. H. GIBSON ET AL — 2,893,110
WHEEL MACHINING TOOL HOLDER
Filed June 18, 1956 — 3 Sheets-Sheet 1
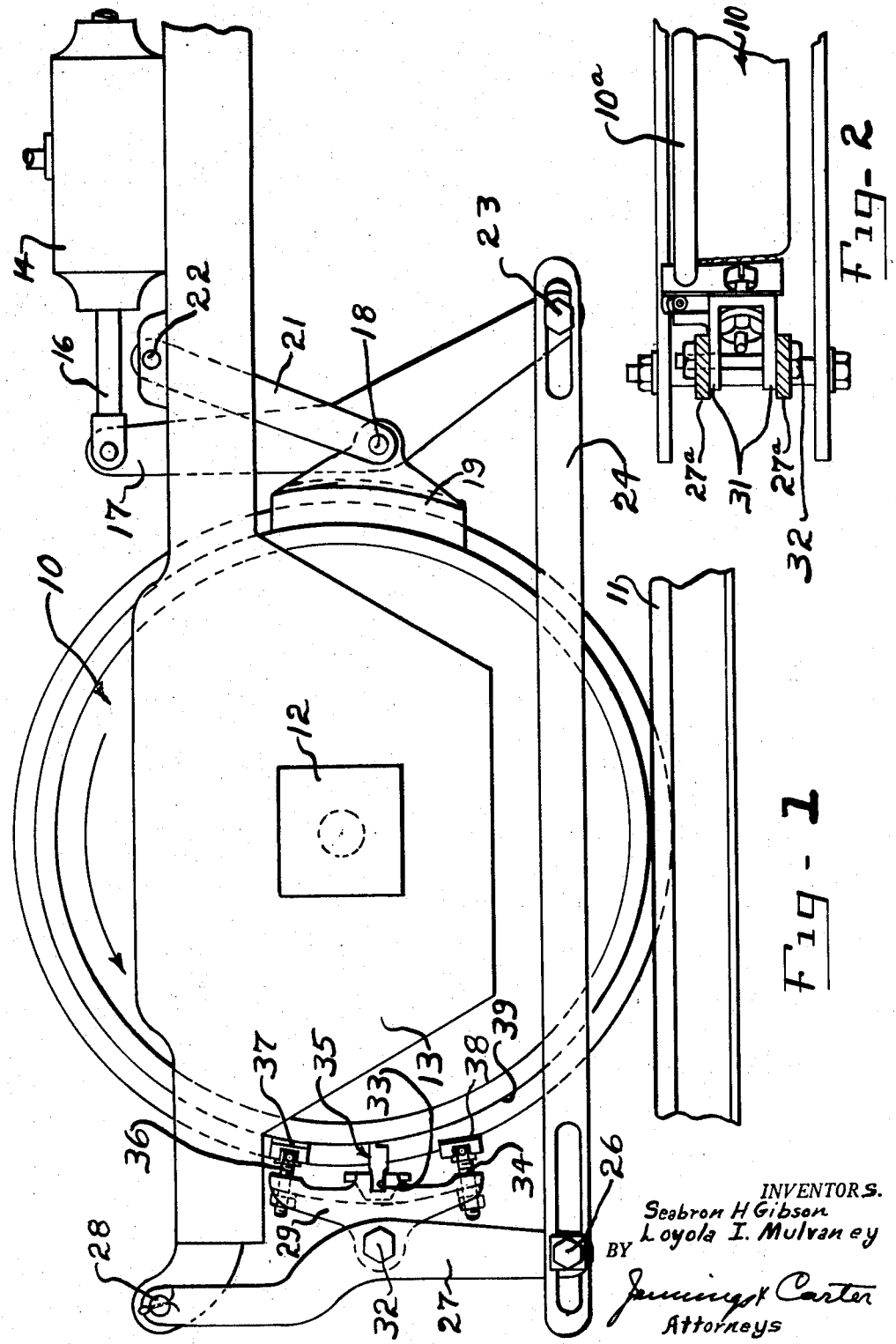
INVENTORS.
Seabron H Gibson
Loyola I. Mulvaney
BY
Jennings & Carter
Attorneys

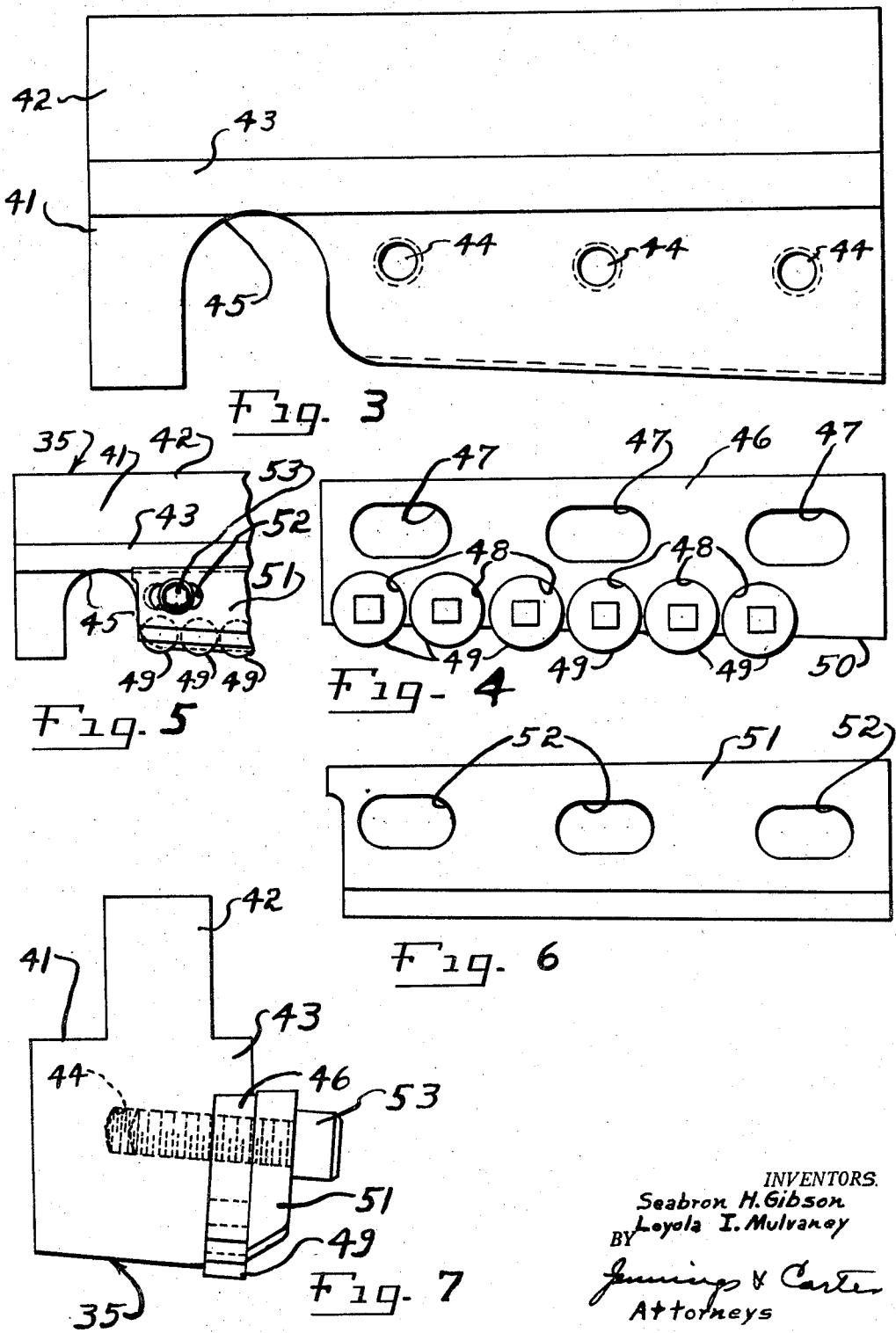

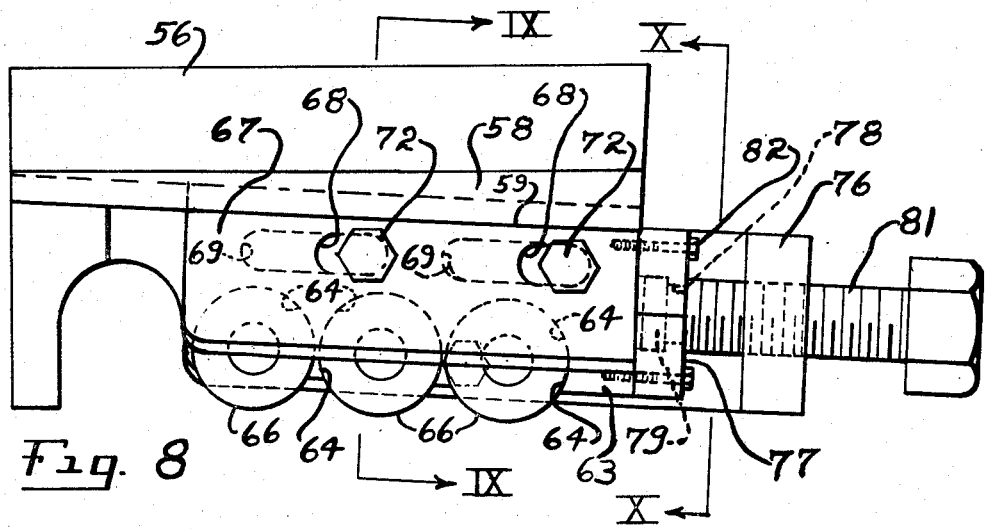
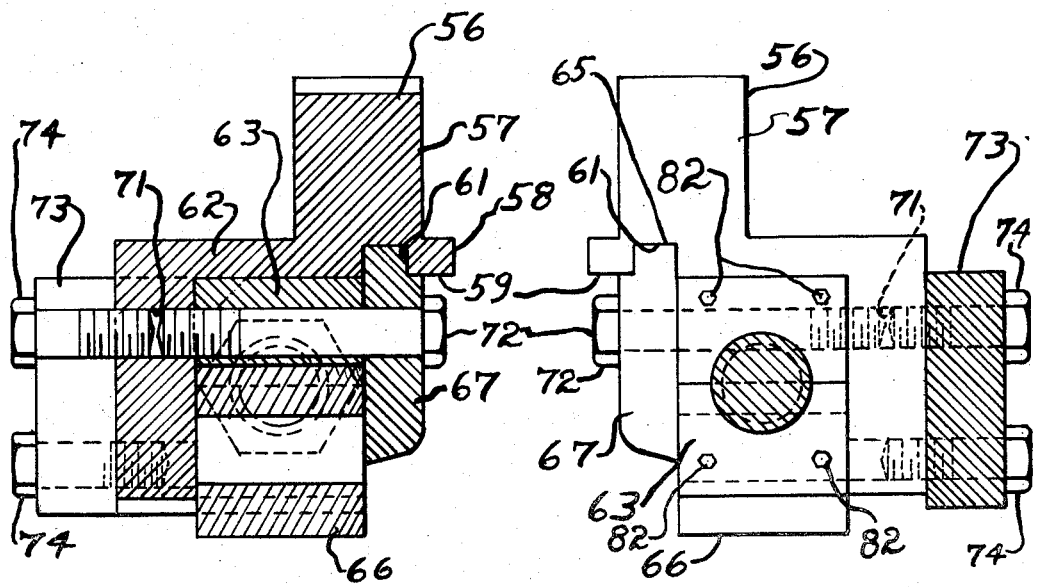

United States Patent Office 2,893,110
Patented July 7, 1959

2,893,110

WHEEL MACHINING TOOL HOLDER

Seabron H. Gibson and Loyola I. Mulvaney,
Birmingham, Ala.

Application June 18, 1956, Serial No. 591,848

4 Claims. (Cl. 29—97)

This invention relates to apparatus for machining the tires or the wheels of railroad rolling stock, especially railroad locomotives, and has for an object the provision of apparatus of the character designated which shall be adapted to operate in cooperation with the air brake system of the locomotive and machine the tires or wheels, without the necessity of removing the wheels from the locomotive, in a minimum of time and with a minimum of labor.

As is well known, the driving wheels of some locomotives, especially diesel locomotives, are cast solid, whereas others are provided with removable tires which are shrunk onto the wheels. Our invention is applicable to either type and wherever in this specification or in the claims the expressions "tire" or "wheel" are employed it is to be understood that they refer to the wheel with its tire portion, whether the latter is separately formed or not.

A still further object of our invention is to provide apparatus for machining the wheels of railroad locomotives which shall be especially adapted to machine the tread portion of the wheel and which shall include cutting elements which are held in place against the tread of the wheel by the air brake pressure usually associated with such vehicles and shall be adjustable across the tread of the wheel whereby to provide the required taper of the tread and the required evenness of turning.

As is well known in the art to which our invention relates, the wheels of railway vehicles, especially locomotives, are subject to considerable wear and damage in service and when certain limits of wear or damage are reached they must be taken out of service and the wheels repaired. Flat spots, broken and chipped flanges, defective treads, and flanges with excessive flat vertical surfaces, are all defects which, under the strict inspection rules by which locomotives are operated, may render a locomotive unfit for service. Heretofore in this art it has been necessary, in such event, to take the locomotive into a shop, remove the defective wheels, and place them in a large wheel lathe to turn them. After turning, the wheels were replaced. All this required a great deal of time and much skilled labor and caused the locomotive to be out of service for a considerable period of time while repairs were being made.

All of the foregoing difficulties are overcome by means of our invention and the wheels or tires are machined in a minimum of time, while on the locomotive and without taking the locomotive out of service, except for a very short period of time. In accordance with our invention we provide a tool holder with a suitable forming tool which is designed for attachment to the locomotive brake rigging in place of a brake shoe on the wheel to be turned. The locomotive air brake is applied with a limited pressure to hold the forming tool against the wheel and the locomotive is moved along the rails. The cutting elements of the tool are disposed across the face of the tread of the wheel at the required taper, and means are provided to adjust the cutting elements to provide evenness of turning.

All these and other important features of our invention are illustrated in the acompanying drawings, forming a part of this application, in which:

Fig. 1 is a side elevation showing a locomotive wheel with our invention applied thereto;

Fig. 2 is a detail plan view, partly in section, showing the cutting tool as it operates against the tread of the wheel;

Fig. 3 is a plan view of the main body portion of the tool holder disassembled from the remaining portions thereof;

Fig. 4 is a detail plan view of the cutting element holder of the tool;

Fig. 5 is a fragmentary plan view of the assembled tool showing one end thereof drawn to a smaller scale;

Fig. 6 is a plan view of the retaining plate employed for holding the cutting elements in place;

Fig. 7 is an end view of the assembled tool;

Fig. 8 is a plan view of an assembled tool showing a modification of our invention;

Fig. 9 is a sectional view taken along the line IX—IX of Fig. 8 drawn to a larger scale than Fig. 8; and Fig. 10 is a sectional view taken along the line X—X of Fig. 8, also drawn to a larger scale.

Referring now to the drawing for a better understanding of our invention, we show in Fig. 1 a fragment of a locomotive embodying a locomotive driving wheel 10 having the usual flange 10a and adapted to move along a track 11 in the direction indicated by the arrow. The axle of the wheel 10 is mounted in a bearing 12 in a frame 13. The locomotive is supplied with the usual airbrake equipment including a brake cylinder 14 having its piston rod 16 connected to a brake lever 17 which is pivotally connected at 18 to a brake shoe 19. A brake hanger 21 supported at 22 from the locomotive frame is also connected to the brake shoe 19 at 18.

The lower end of the brake lever 17 is connected at 23 to an equalizing rod 24 which extends across to the other side of the locomotive wheel and is connected at 26 to the lower end of a brake lever 27. The brake lever 27 is pivotally supported from the frame 13 at 28 and functions also as a brake hanger. As may be seen in Fig. 2, the brake lever 27 is comprised of two bars 27a.

Instead of a brake shoe and its head (not shown) being supported from the brake lever 27, we provide a tool holding bracket 29. The bracket 29 is somewhat arcuate in cross section and is provided with rearwardly extending lugs 31 by means of which it is pivotally connected at 32 to the brake hanger members 27a. Midway between the ends of the bracket 29, on the side facing the wheel 10, is a transverse slot 33 for receiving a tool holder, to be described presently. Extending through the bracket 29 at the opposite ends thereof, are adjusting bolts 34 and 36 which have mounted on the inner ends thereof shoes 37 and 38 adapted to bear upon the tread 39 of the wheel 10. The shoes 37 and 38 are pivotally connected, as shown, to the bolts 34 and 36, whereby to ride evenly upon the tread 39. Also, it will be noted that only one of the shoes bears against the tread at a time during the machining operation. When the machining is completed both shoes bear against the tread. With the wheel moving in the direction indicated by the arrow, the upper shoe 37 bears against the tread during the machining operation whereas when the wheel is moving in the opposite direction, the shoe 38 bears against the tread. The shoes provide elongated contact with the tread so as not to be affected by relatively short unevenness in the tread of the wheel.

Referring now to Figs. 3 to 7 inclusive, the tool holder 35 includes a main body portion 41 having a relatively narrow side portion 42 which fits slidingly in the groove 33 of the tool holder bracket 29. Also, the main body portion of the tool holder is provided with an arcuate slot 45 which fits over the flange 10a of the wheel whereby, as will later be seen, to compensate for relative lateral movement of the locomotive wheel. A longitudinal ridge 43 extends from end to end of the main body portion on the side of the tool holder facing the wheel. The main body portion is also provided with a plurality of spaced longitudinally aligned, tapped holes 44.

Fitting over the main body portion is a cutting element holder 46 which is of such dimension as to have its upper edge, as viewed in the drawing, to bear against the rib 43 on the main body portion, the rib forming an abutment for the holder 46. See Fig. 7. The cutting element holder 46 is provided with spaced elongated holes 47 which register with the tapped holes 44 in the main body portion. Provided in the working, or lower edge, of the cutter holding member 46 facing the wheel, as viewed in the drawing, are a plurality of substantially contiguous arcuate recesses 48 which extend entirely through the member, each of which comprises somewhat more than a semicircle. The recesses 48 are adapted each to receive a cylindrical cutting element 49 which fits snugly, but slidingly, therein and which protrudes from the lower edge of the holder, as seen in Fig. 4 of the drawing. The cutting elements 49 are well understood in the art and require no detail description. They extend outwardly from the edge of the holder 46 in position to engage the tread of the wheel when the tool is in use. The lower edge 50 of the cutter holding member 46, as viewed in the drawing, is formed at an angle to the opposite edge which bears against the rib 43, corresponding to the taper of the tread of the wheel.

Fitting over the cutter holding member 46 is a retaining plate 51 which is also provided with spaced elongated holes 52 corresponding to the holes 44 in the main body portion 41. Cap screws 53 pass through the holes 52, the holes 47, and into the tapped holes 44, as shown in Fig. 7, to hold the parts in assembled relation.

From the foregoing description the operation of our improved apparatus, as so far described, and the method of its use will be readily understood. Whenever the tread of a wheel requires machining for any of the defects such as hereinbefore enumerated, we first remove one of the brake shoes serving that particular wheel, together with its supporting head (not shown), and mount in its place our improved tool holder bracket 29 with the forming tool 35 mounted slidably in the transverse slot 33. The limit shoes 37 and 38 are set with one shoe spaced from the tread 39 a distance equal to the depth of the cut to be taken. The locomotive brake is then set with a limited pressure which we have found should be from 10 to 20 pounds per square inch in the brake cylinder. With this limited pressure in the brake cylinder, the locomotive may be driven by its own power or towed along the rails 11. With the wheel 10 traveling in the direction indicated by the arrow, the limit shoe 37 engages the tread 39 of the wheel and causes the cutting elements 49 to engage the tread of the wheel and machine it down to the required form. When the machining is completed both limit shoes bear against the tread 39 and the cutting action stops. When this occurs the wheel will be found to be as round as before machining. Should the locomotive be moved in the opposite direction from that indicated, the limit shoe 38 engages the tread and the shoe 37 leaves the tread. When moving in either direction, the cutting elements 49 operate to machine the tread of the wheel. By means of the adjusting bolts 34 and 36, the depth of the cut made by the tool may be adjusted.

During this operation, the curved slot 45 on the inner end of the tool is engaged over the flange of the wheel so as to prevent lateral movement of the tool on the wheel and to compensate for the lateral movement of the wheel with respect to the frame.

In order to adjust the position of the cutting elements laterally on the tread of the wheel, the cap screws 53 may be loosened and by tapping the cutting element holder 46 in the required direction, the cutting elements may be properly positioned. The retaining plate 51 may also be adjusted, by reason of the elongated holes 52 and cap screws 53 to overhang the slot 45 and adapt the tool for use with flanges of varying thickness as will be readily understood. The cap screws 53 are then tightened and the tool is again ready for use. The cutting elements 49 fit slidably in the recesses 48 whereby, when worn, they may be rotated in the recesses to provide fresh cutting edges.

Referring now to Figs. 8 to 10 inclusive of the drawings we show a modified form of our invention in which we employ a tool holder embodying a main body portion 56 having a relatively narrow portion 57 on the rear side thereof adapted to fit in the transverse slot 33 of the tool holder bracket 29 and a relatively heavier front portion 62. A rib 58 extends longitudinally of the front side of the main body portion. The lower side 59 of the rib 58 is at an angle to the upper edge of the main body portion 56 as viewed in the drawing, the angle conforming to the standard taper of a railroad vehicle wheel. A groove 61 is provided in the main body portion rearwardly of the rib 58. The heavier portion 62 of the main body is provided in order to support the larger cutting elements which we preferably employ with this modification.

Fitting against the front face of the main body portion is a cutting element holder 63 which is provided with a plurality of arcuate recesses 64 in the working, or lower edge, thereof as viewed in the drawing. The recesses 64, as in the previously described modification, comprise more than a semi-circle and each accommodates a cutting element 66 which protrudes from the lower edge of the holder 63.

Fitting over the holder 63 is a retaining plate 67. The upper edge 65 of the retaining plate fits snugly in the groove 61 as shown in Fig. 10. The retaining plate 67 is provided with elongated holes 68 and the cutting element holder 63 is provided with elongated holes 69 (shown in dotted lines in Fig. 8) which register with tapped holes 71 in the main body portion 56. Cap screws 72 extend through the retaining plate 67, the cutting element holder 63 and into the tapped holes 71 to hold the parts in assembled relation as shown in the drawing. The cap screws are so set as to allow for lateral feeding of the cutting elements as will be shown. As in the previous modification, the retaining plate 67 is adjustable to compensate for flanges of varying thicknesses.

In order to adjust the position of the cutting elements laterally of the tread of the wheel, we provide an angle bracket 73 which may be secured to the rear of the main body portion 56 by means of cap screws 74 and which embodies an angular portion 76 overhanging the outer end of the cutting element holder 63. The cutting element holder 63 is provided with a removable end piece 77 having an undercut groove 78 therein to receive the button head end 79 of a feed and set screw 81. The removable end piece 77 may be secured to the cutting element holder by any suitable means such as the cap screws 82.

With this arrangement it will be seen that the cutting elements 66 may be adjustably positioned over the tread of the wheel by varying the position of the cutting element by means of the feed and set screw 81. The feed and set screw 81 thus serves the double function of providing means for setting the initial position of the cutting elements and for feeding them across the tread of the wheel during the machining operation. With either modification of our invention, it will be apparent that we have devised a tool for turning the tires or wheels of railroad rolling stock which is simple of design and operation and which may be readily set to accommodate and remove the defects on a wheel tread.

While we have shown our invention in but two forms, it will be obvious to those skilled in the art that it is not so limited, but is susceptible of various other changes and modifications without departing from the spirit thereof, and we desire, therefore, that only such limitations shall be placed thereupon as are specifically set forth in the appended claims.

What we claim is:

1. For use in machining the treads of flanged wheels, a tool holder having a curved slot at one end adapted to fit over a wheel flange and having openings spaced along a side thereof, a cutting element holder mounted on the tool holder and having a plurality of elongated slots therein registering with said openings in the tool holder, said cutting element holder having a working edge disposed adjacent the curved slot and a plurality of contiguous arcuate recesses extending through said working edge, each of said recesses comprising slightly more than a semi-circle, a cylindrical cutting element mounted in each recess and projecting beyond the tool holder in cutting position, a retaining plate mounted over the cutting element holder and having a plurality of elongated slots therein registering with the openings in the tool holder and the slots in the cutting element holder, and securing means passing through the slots in the retaining plate and the cutting element holder and into the openings in the tool holder, whereby the retaining plate and cutting element holder are movable with respect to the securing means to provide for adjustment of the positions of the cutting elements relative to the tool holder.

2. A tool holder as defined in claim 1 in which the retaining plate is mounted over the cutting element holder to hold it in place and in which securing means pass through enlarged openings provided in the retaining plate and in the cutting element holder into tapped holes in the tool holder, and in which an adjusting screw cooperates between the tool holder and the cutting element holder to position the cutting elements laterally with respect to the tread of the wheel.

3. A tool holder as defined in claim 1 in which the position of the retaining plate is adjustable to extend part way over the curved slot, thereby to compensate for flanges of varying thicknesses.

4. A tool holder as defined in claim 1 in which the inner edge of the tool holder is provided with an abutment extending at an angle to the edge thereof remote from the working edge, corresponding to the taper of the wheel tread, and in which means are provided to adjust the position of the cutting element holder on the tool holder laterally of the tread of the wheel.

References Cited in the file of this patent

UNITED STATES PATENTS

| | | |
|---|---|---|
| 798,856 | Wetter | Sept. 5, 1905 |
| 1,211,155 | Honea | Jan. 2, 1917 |
| 1,383,630 | Hoagland | July 5, 1921 |
| 1,416,843 | Labonte | May 23, 1922 |
| 1,637,330 | Hearn et al. | Aug. 2, 1927 |
| 1,668,512 | Miller | May 1, 1928 |
| 1,713,248 | Zimarik | May 14, 1929 |
| 2,213,002 | Hall | Aug. 27, 1940 |
| 2,321,765 | Moyer | June 15, 1943 |
| 2,402,650 | Maffia | June 25, 1946 |
| 2,645,003 | Thompson et al. | July 14, 1953 |
| 2,703,031 | Glooskin | Mar. 1, 1955 |
| 2,770,028 | Bonnafe | Nov. 13, 1956 |
| 2,833,026 | Kostka | May 6, 1958 |

FOREIGN PATENTS

| | | |
|---|---|---|
| 213,719 | Great Britain | Apr. 10, 1924 |

OTHER REFERENCES

Catalog Publication Kennametal, No. 54, copyright 1953, page 37, copy obtainable from Kennametal Inc., Latrobe, Pa.